(12) United States Patent
Long et al.

(10) Patent No.: US 6,973,362 B2
(45) Date of Patent: Dec. 6, 2005

(54) METHODS FOR EVALUATING CHEMICAL COMPONENTS BASED ON THEIR PROPOSED FUNCTION IN THE PRODUCT THEY ARE TO BE USED IN

(75) Inventors: David C. Long, Racine, WI (US); Frederick H. Martin, Racine, WI (US); John A. Weeks, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 226 days.

(21) Appl. No.: 10/458,746

(22) Filed: Jun. 10, 2003

(65) Prior Publication Data

US 2004/0254742 A1 Dec. 16, 2004

(51) Int. Cl.⁷ .............................................. G06F 19/00
(52) U.S. Cl. ...................................... 700/107; 700/106
(58) Field of Search ......................... 700/97, 106, 107, 700/266; 705/8, 28, 29; 702/22

(56) References Cited

U.S. PATENT DOCUMENTS

| | | | |
|---|---|---|---|
| 5,311,437 A | 5/1994 | Leal et al. ................... 700/106 |
| 5,532,928 A | 7/1996 | Stanczyk et al. ............... 705/7 |
| 5,652,708 A | 7/1997 | Miyamoto et al. .......... 700/106 |
| 5,664,112 A | 9/1997 | Sturgeon et al. .............. 705/28 |
| 5,712,990 A | 1/1998 | Henderson .................... 705/28 |
| 5,726,884 A | 3/1998 | Sturgeon et al. ............... 705/9 |
| 5,852,560 A | 12/1998 | Takeyama et al. ............ 700/97 |
| 5,864,483 A | 1/1999 | Brichta ........................ 700/109 |
| 5,878,433 A * | 3/1999 | Miyamoto .............. 707/103 R |
| 5,933,765 A | 8/1999 | Newton et al. ............. 455/90.2 |
| 6,073,055 A | 6/2000 | Jahn et al. ...................... 700/97 |
| 6,097,995 A | 8/2000 | Tipton et al. ................ 700/266 |
| 6,122,622 A | 9/2000 | Wiitala et al. ................. 705/28 |
| 6,163,732 A | 12/2000 | Petke et al. .................. 700/106 |
| 6,272,390 B1 | 8/2001 | Skovgaard .................. 700/103 |
| 6,280,519 B1 | 8/2001 | Yezrielev et al. ............ 106/311 |
| 6,311,134 B1 | 10/2001 | Sorenson ...................... 702/22 |
| 6,330,487 B1 | 12/2001 | Jahn et al. ..................... 700/97 |
| 6,341,287 B1 | 1/2002 | Sziklai et al. ............... 707/102 |
| 6,397,115 B1 | 5/2002 | Basden ......................... 700/83 |
| 6,408,227 B1 | 6/2002 | Singhvi et al. ............. 700/266 |
| 6,816,792 B2 * | 11/2004 | Sakurai et al. ................ 702/30 |
| 2002/0010524 A1 | 1/2002 | Jin et al. ..................... 700/106 |
| 2002/0065581 A1 | 5/2002 | Fasca ......................... 700/266 |

OTHER PUBLICATIONS

"Chemical Use Clusters Scoring Methodology", U.S. Environmental Protection Agency (1993).*

Murarka et al., "Review of the Use Cluster Scoring System: A Risk Screening Method for Groups of Commercial Chemicals by Use", Science Advisory Board (SAB) Report (1996).*

Davis et al., "Chemical Hazard Evaluation for Management Strategies: A Method for Ranking and Scoring Chemicals by Potential Human Health and Environmental Impacts", The University of Tennesse Center for Clean Products and Clean Technologies (1994).*

An Aug., 2002 web site ad entitled "Consumer, Industrial and/or Institutional Cleaning Products", describing the Environmental Choice Program.

(Continued)

Primary Examiner—Leo Picard
Assistant Examiner—Ryan Jarrett

(57) ABSTRACT

Disclosed are methods for evaluating the environmental impact of various chemical components as a function of their proposed functional use in a chemical product, methods for formulating products based on those evaluations, and databases for assisting in those methods. Consumer products can be environmentally improved using these methods. Environmental criteria are in part developed based on the nature of the ultimate use of the product, and usually vary for a given chemical between types of proposed uses. The environmental classes for components are adjusted by their weight representation in the final product.

14 Claims, 13 Drawing Sheets

OTHER PUBLICATIONS

B. Quinn, "Creating A New Generation Of Environmental Management", Pollution Engineering (1997).

Apparent reprint of R.P. Sandique, "Rating System For 2,000 Industries in Manila Set", Manila Standard, Dec. 9, 1996.

M.B. Swanson et al., "Chemical Ranking and Scoring", Proceedings of the Pellston Workshop On Chemical Ranking And Scoring (1995).

* cited by examiner

Surfactant Category Example

Surfactant Category Example

Surfactant Category Example

Surfactant Category Example

METHODS FOR EVALUATING CHEMICAL COMPONENTS BASED ON THEIR PROPOSED FUNCTION IN THE PRODUCT THEY ARE TO BE USED IN

CROSS-REFERENCE TO RELATED APPLICATIONS

Not applicable.

STATEMENT REGARDING FEDERALLY SPONSORED RESEARCH/DEVELOPMENT

Not applicable.

BACKGROUND OF THE INVENTION

The present invention relates to methods for producing products with reduced environmental "footprints". Such methods appear particularly useful in formulating consumer products such as cleaning chemicals, air care products, and home insecticides.

Many consumers have a preference for products which have (or are at least perceived by them to have) lesser adverse environmental impacts than other competing products. This is evidenced by the growth of the "organic" foods market, and the labeling of products with markings such as "environmentally friendly" or "green".

Apart from consumer preferences for environmentally friendly products, governments are increasingly regulating from an environmental standpoint the content of products, and in certain cases the additional responsibilities of companies during their manufacture, transportation and disposal. To insure the widest distribution and acceptance of their products, manufacturers therefore have good reason to take into account a wide variety of differing environmental legal requirements.

There are also other significant business reasons for formulating products with reduced environmental impacts. One such additional reason is to reduce the potential for future litigation if certain chemicals are mishandled (e.g. avoiding Superfund type issues).

The art has therefore begun to develop a number of different techniques for taking into account environmental issues when formulating products and acquiring their raw materials. In one approach the art has developed a public "grading system" of suppliers insofar as their environmental practices are concerned.

If a component is purchased from a company that follows strict environmental protection procedures, the impact on the environment from buying from that company may well be less than if the component is purchased from a company having a history of improper waste disposal. The environmental history of raw material supplier companies, and their current environmental procedures, are being taken into account by various agencies that assign suppliers environmental grades. These grades are made available to purchasing managers, who (all other things being equal or roughly equal) may make purchasing decisions based thereon.

Also known in the art are grading systems which grade possible adverse environmental effects of the resulting products. For example, the art has made a combined environmental impact ranking which factors in a variety of information such as defined toxicity criteria. Such systems are also known to be associated with certain seals of approval by organizations having a perceived objective reputation regarding environmental matters.

However, these prior art systems typically grade a particular component without taking into account that a given component may have significantly different environmental impacts depending on the type of product it is to be used in, and what that product is to be used for. For example, phosphate used in a consumer cleaner intended to be flushed into the drain water supply by consumers would normally be perceived as environmentally undesirable due to foaming problems in rivers and the like, and the tendency of phosphates to increase undesired plant growth. However, the presence of a phosphate in certain industrial cleaners that are typically disposed in other ways could well have little adverse environmental impact.

Also known are systems which adjust the grades of input components of a product by their relative weight in that product. For example, U.S. Pat. No. 5,933,765 discloses an environmental grading system in which a product containing multiple components has each of its input components provided with a numerical score based on factors such as toxicity, ingredient bans, and legislative concerns. Each component is compared to a single published limit (such as a Dutch PPT Telecom standard) and a numerical value for that component is assigned.

The scores are then weighted based on the relative percentage weight of the raw material to provide an overall score for the resulting product. Again, only one possible score is provided for a given raw material chemical, regardless of application, albeit that score is weighted by prominence in the final product.

Thus, prior art environmental grading or rating systems do not provide an optimal system for formulating products, especially when a company develops a wide variety of different types of products having different applications, and some chemicals are used in more than one type of product.

To be commercially viable over the long term a product must meet certain cost and performance criteria, regardless of environmental attributes. Thus, in some cases environmental grading will not be the deciding factor. However, it is desired that a better system be developed for evaluating the environmental impact of chemical components and for formulating products having improved environmental characteristics for any given cost and performance criteria. Moreover, even where there are some differences in cost and performance between competing proposed formulas, such an improved environmental grading system is still desired as that will at minimum more meaningfully advise the formulator as to the nature of the trade-offs.

SUMMARY OF THE INVENTION

The present invention provides a method for environmentally classifying an environmental impact of a chemical component for a selected functional use. The chemical component is initially assigned to a category based on a proposed functional use of the chemical component. The functional uses could include, for example, as a surfactant, solvent, propellant, antimicrobial, preservative, chelant, antioxidant, absorbent, thickener, lubricant, colorant, fragrance, corrosion inhibitor, builder, whitening agent, plasticizer, wax, polish or stabilizer.

The chemical component is then compared to at least two environmental category-specific criteria associated with the category, and a class numerical value is assigned to the chemical component based on the result of the comparison. This process is continued for each category-specific criterion associated with the selected category, and an average (or other combination) of the values is calculated for the chemical component to provide an overall environmental class for the chemical component.

The environmental classes determined for each of the chemical components in a chemical product can be multiplied by their relative weight presence in the product being formulated. The results for each component are then added together. The resulting combined "grade" provides an overall environmental grade for the product.

The criteria applied to the chemical components may, for example, reflect criteria selected from the group consisting of aquatic toxicology, biodegradability, acute human toxicity, European Union environmental classification, supplier, vapor pressure, water partition coefficient, propellant rating, aquatic toxicity, and bio-accumulation.

As an example, the aquatic toxicology criteria may reflect a comparison to a LC50 standard, the biodegradability criteria may reflect a comparison to an OECD 301 standard, the acute human toxicity criteria may reflect a comparison to an LD50 standard, the supplier criteria may reflect a comparison to an ISO 14001 environmental standard, the water partition coefficient criteria may reflect the degree of correlation with a level of toxicity and bio-concentration, the propellant criteria may reflect a rating of certain non-hydrocarbon gasses as more favorable than hydrocarbon propellants, and the bio-accumulation criteria may reflect a comparison to fish BCF.

In another form the invention provides a method for formulating a product. One obtains two possible formulas for the product, each formula having at least two chemical components. One conducts the above method to determine an environmental class for each chemical component in each formula. The environmental class for each chemical component is then multiplied by the relative weight of the component in the formula, and the results summed to provide an overall environmental grade for each of the first and second formulas. One then compares the resulting overall environmental grades for the formulas.

In yet another aspect the invention provides an environmental classification system database. One provides a database containing a plurality of categories of data representing classes of likely use of products to be evaluated. There is a first environmental class for a given chemical component present in a first of said categories as a part of the database. There is also a second environmental class having a different value than the first, for that same chemical component, that is present in a second of said categories as a part of the database.

The database may be contained in a wide variety of different types of media desired. For example, it may be part of a book. Alternatively, it may be a computer database accessible by a software searching facility (e.g. a Lotus database).

In one embodiment a numerical grade for a component with respect to a class can be assigned such as 3, 2, 1 or 0 (with 3 being best and 0 being poor). Importantly, a component may have a 0 rating in one class of application (e.g. a biocide for a preservative), and may have a higher rating for another class of application (e.g. a biocide used in a disinfectant).

The present invention thus helps a company evaluate competing product formulas so as to take into account environmental concerns in a more ordered way. This is particularly valuable where two or more formulas are reasonably acceptable from a cost and performance standpoint.

An important advantage of the invention is that it permits a company to quickly modify the database criteria for each class as law and scientific knowledge develop (e.g. if a particular jurisdiction adopts a new regulation). Moreover, the system does not require that any particular chemical bear a "scarlet letter" for all purposes. Rather, it evaluates each chemical component from the standpoint of its ultimate use.

Moreover, the invention is capable of being automated, and even if implemented via manual means (e.g. a text and manual calculation) is easy to use and implement, at low cost. These and still other advantages of the present invention will appear from the following description. In that description reference is made to the accompanying drawings in which there is shown by way of illustration preferred embodiments of the invention. However, the claims should be looked to in order to judge the full scope of the invention.

DETAILED DESCRIPTION OF THE PREFERRED EMBODIMENT

Figure 1:
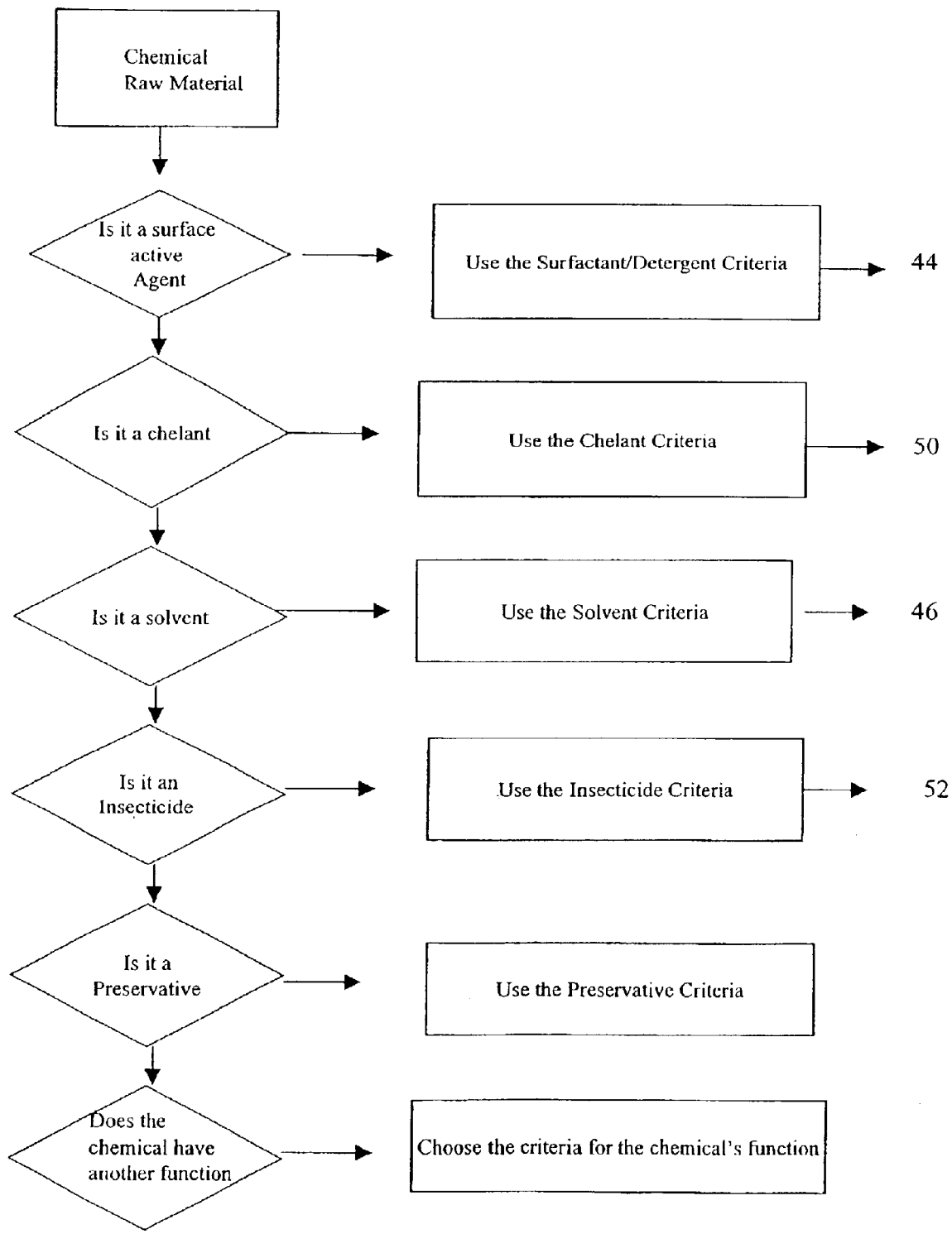
FIG. 1 is a flow chart illustrating a selection of a functional category for a chemical.

FIG. 1 depicts a flow chart illustrating a determination of a functional category for a chemical raw material. Initially, the chemical component is categorized in a category selected based on the functional use proposed for the component (e.g. a surfactant use 44).

For that category, the surfactant component is initially preferably compared to the five primary category-specific environmental criteria associated with the selected functional category (see FIGS. 2–6), and a "class" value indicating a level of environmental impact is assigned for each category-specific criteria for that chemical. An overall environmental class/grade for the chemical component is then preferably calculated as the sum of the class values for each of the category-specific divided by the number of category specific criteria to determine an average. Alternatively, the values could be otherwise combined, or could be weighted in some manner depending on the importance of each criteria for that application.

Although the environmental classification method could be used for any number of different functional categories, including, for example, solvents, propellants, chelants, and insecticides, the method will primarily be described hereafter with reference to criteria applied for use in a surfactant. Referring still to FIG. 1, for a surfactant 44, five different category-specific criteria are analyzed, and referring also to FIG. 8 an adjustment can optionally be made for "other factors" which are important to the environmental impact of chemical components in the selected category. As described, a numerical class value is assigned for each category-specific criteria.

The class values for each of the category specific criteria are then summed, and an average is calculated 80. The average can be adjusted based on the class specific criteria (130–140) shown in FIG. 8. Here, a class of 3 is assigned if the chemical component has only limited environmental impact as compared to the category-specific criterion, a class of zero is assigned if the chemical component has extremely significant impact, and grades of one and two are assigned for impact levels between these ends of the scale. Although the method is described with reference to this selected numerical scale, it will be apparent that alternative numerical scales, with or without weighting, can be provided.

The resulting environmental class for the chemical component can be used as a direct comparison for chemical components, or can be multiplied by its proposed weight and an environmental grade for a product determined as a sum of the scores of the chemical components multiplied by their relative weights in the product. One way of doing this is multiplying the scores by the percentage of presence of each component. Another is to multiply the percentages by 100 and use those for the multiplying. Still other techniques can be used to reflect weight presence.

Where all other factors are equal, the better overall environmental grade may be used as a determinative factor in selecting the final formulation. Where there are some significant differences in the cost or performance of the competing formulas, the environmental grade may be taken into account as an additional significant factor arguing for one formula over the other.

FIGS. 2–6 and 8 illustrate the category-specific criteria associated with surfactant 44, wherein the preferred criteria that are considered in the development of the environmental class for the surfactant category are noted. Here, the category-specific criteria include aquatic toxicology 54, ultimate biodegradability 56, acute human toxicity lethal dose 58, European union environmental classification 60, supplier/source 62, and other significant concerns 130–140 can be factored in with respect to particular chemicals used.

Figure 2:
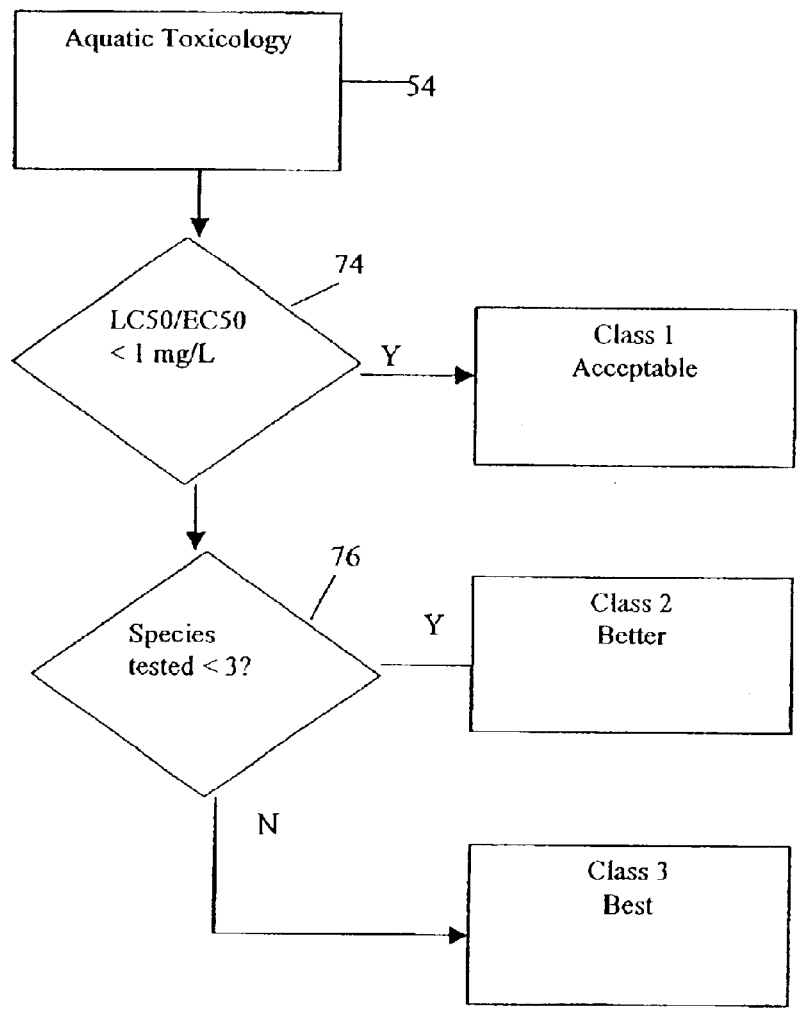
FIG. 2 is a chart illustrating methods relevant to aquatic toxicology for surfactants.

Referring now specifically to FIG. 2 a flow chart illustrating the steps in analyzing the chemical component or raw material for the aquatic toxicology criteria 54 is shown. The aquatic toxicology 54 criteria is particularly useful in analyzing products which are disposed down a drain, which are used out-of-doors, and which can be spilled on or in land disposal sites either through runoff or leaching.

The test comprises comparing the raw material against a "lethal concentration to kill 50%" standard known in the art for providing a concentration of the raw material in test animals over a given time. For example, the LC50 comparison level 74 could be 1 mg/L. If the LC50 level of the raw material is less than 1 mg/L for a tested specie, the raw material can be assigned a numerical class value of one. If the LC50 rating is greater than 1 mg/L but the number of species tested is less than 3 (76), the raw material can be assigned a class of 2 for this criteria. Otherwise, if the LC50 rating is always greater than 1 mg/L and more than three species have been tested to reach this conclusion, the class can be 3.

Figure 3:
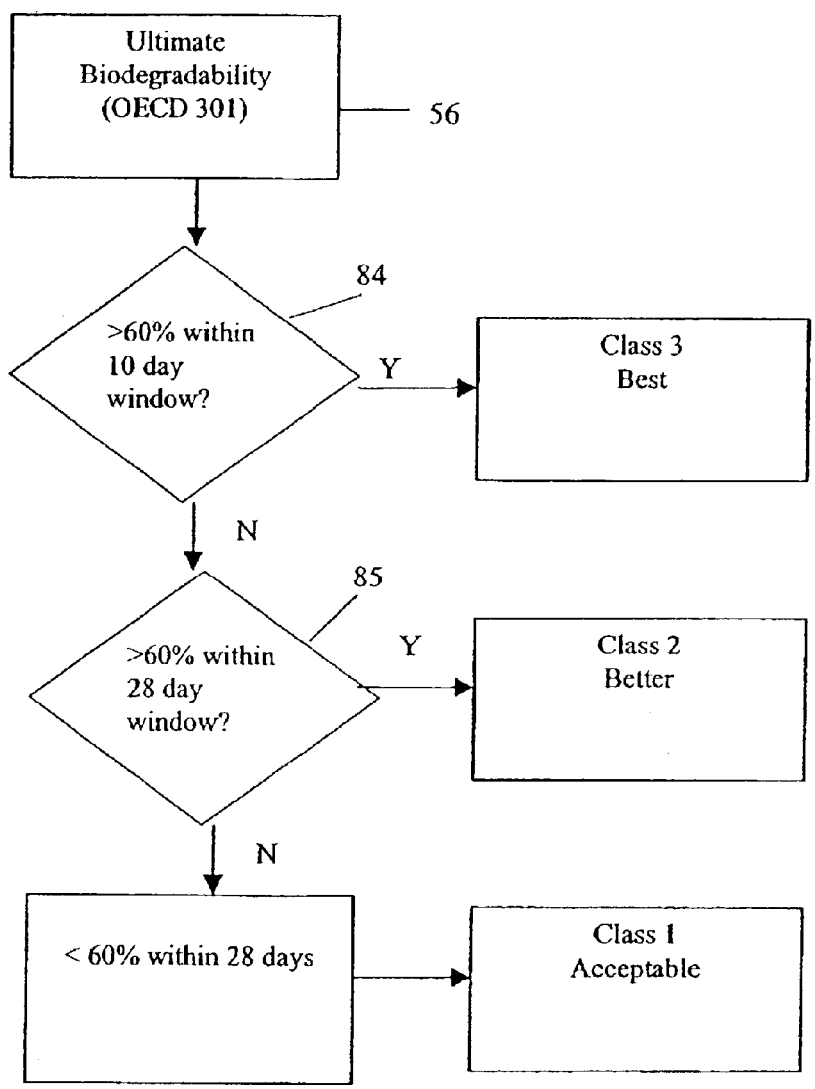
FIG. 3 is a chart illustrating methods relevant to ultimate biodegradability for surfactants.

Referring now to FIG. 3, the ultimate biodegradability category-specific criteria 56 can be based on the half-life of the raw material, as defined in the Organization for Economic Cooperation and Development (OECD) 301 Standard. This criteria is mostly relevant to aquatic environmental affects but also correlates with half-lives on land. The raw material can be assigned a class of 3 if more than 60% of the material is biodegraded within a 10-day window (84) as described by the international standard OECD 301 test series. If not, but if more than 60% of the material is biodegraded within a 28-day window (86) it is assigned a class of 2. Alternatively, if less than 60% is biodegraded within 28 days the raw material is assigned a class of 1.

Figure 4:
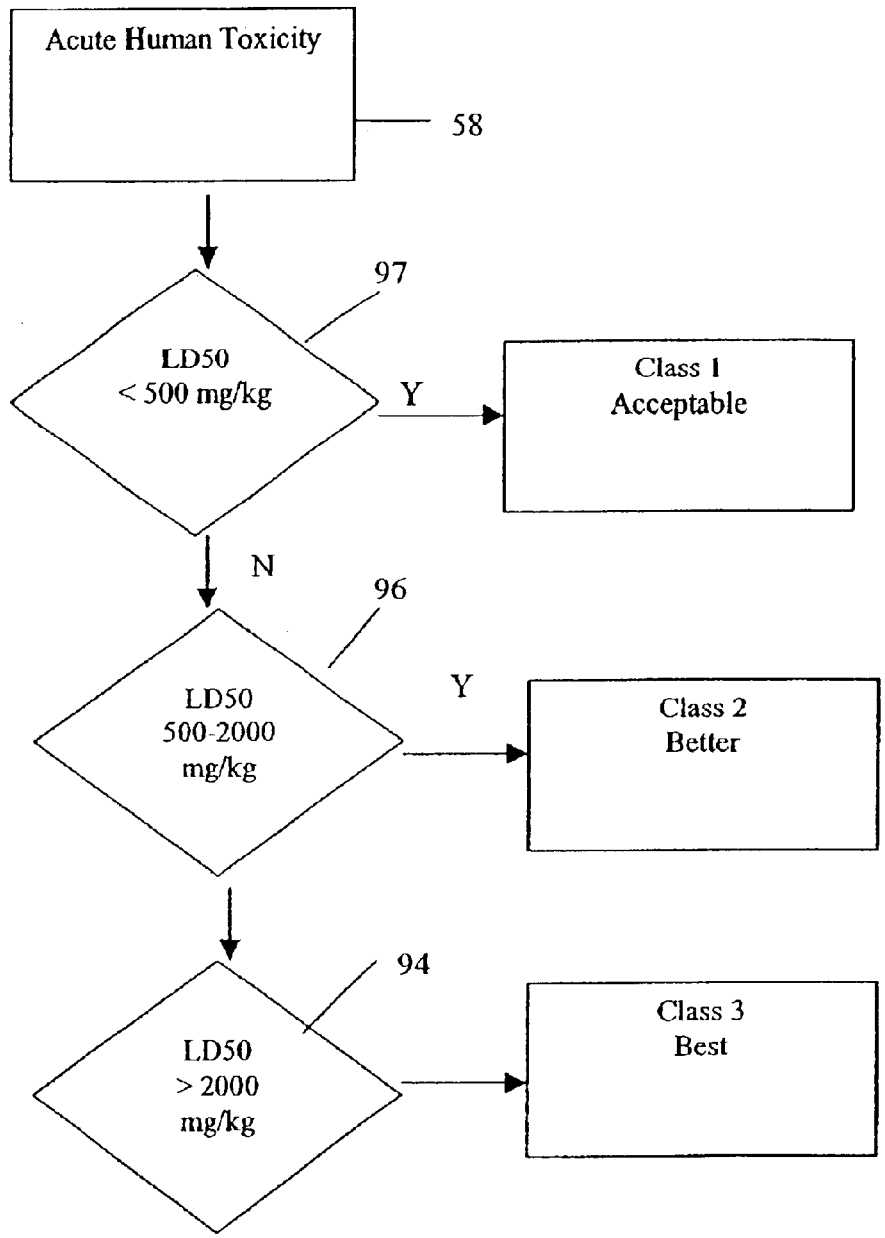
FIG. 4 is a chart illustrating methods relevant to acute human toxicity for surfactants.

Referring now to FIG. 4, the acute human toxicity 58 category-specific criteria defines a minimal parameter for potential toxicity to humans and is compared to a lethal dose standard, LD50, known in the art, for measuring short-term poisoning potential. The raw material can be rated as a class of 3 if the LD50 rating is greater than 2000 mg/kg (94). If the LD50 is instead between 500 and 2000 mg/kg (96) the raw material can be assigned a class of 2 for this category specific criteria. Otherwise it can be assigned a class of 1.

Figure 5:
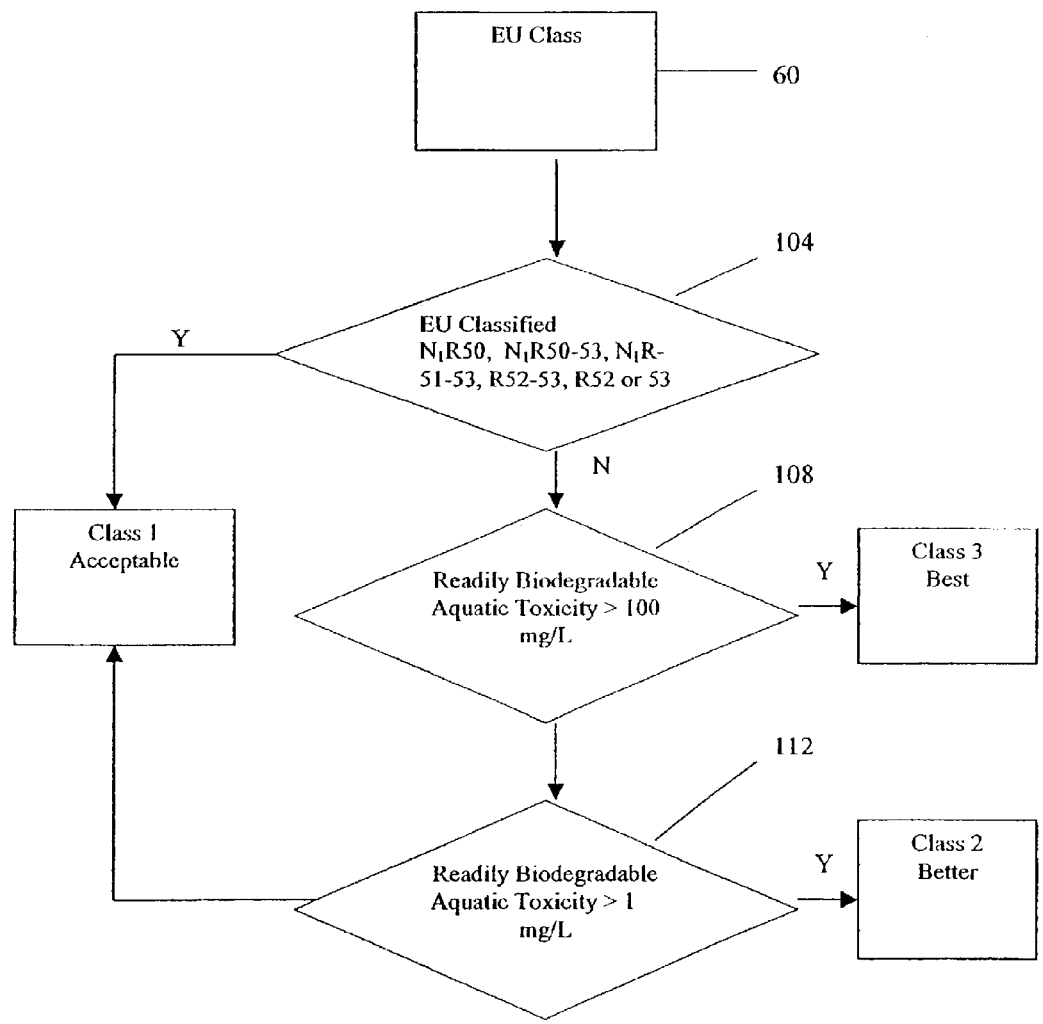
FIG. 5 is a chart illustrating methods relevant to European Union classifications for surfactants.

Referring now to FIG. 5, the European Union environmental classification category-specific criteria can be determined based on ecological parameters defined in the European Union. To determine the class value assigned to the raw material with respect to this category-specific criteria, an analysis is first made to determine whether an adverse European class applies to the raw material (104). If no adverse class applies, and the raw material has an aquatic toxicity level greater than 100 mg/L and the raw material is readily biodegradable (108), the raw material can receive a class of 3.

If the aquatic toxicity is less than 100 mg/L but greater than 1 mg/L and it is readily biodegradable (112), it can receive a class of 2. However, if any European Union classification N, R50; N, R50–53, N, R51–53, R52–53, R52, or R53 applies, the raw material can be assigned a class of 1.

In the European Union Classification system, the R50 criteria indicates that the raw material is very toxic to aquatic organisms, the European Union R51 classification indicates that the material is toxic to aquatic organisms, the R52 classification indicates that the material is harmful to aquatic organisms, and the R53 indicates that the material may cause long-term adverse effects in an aquatic environment.

Figure 6:
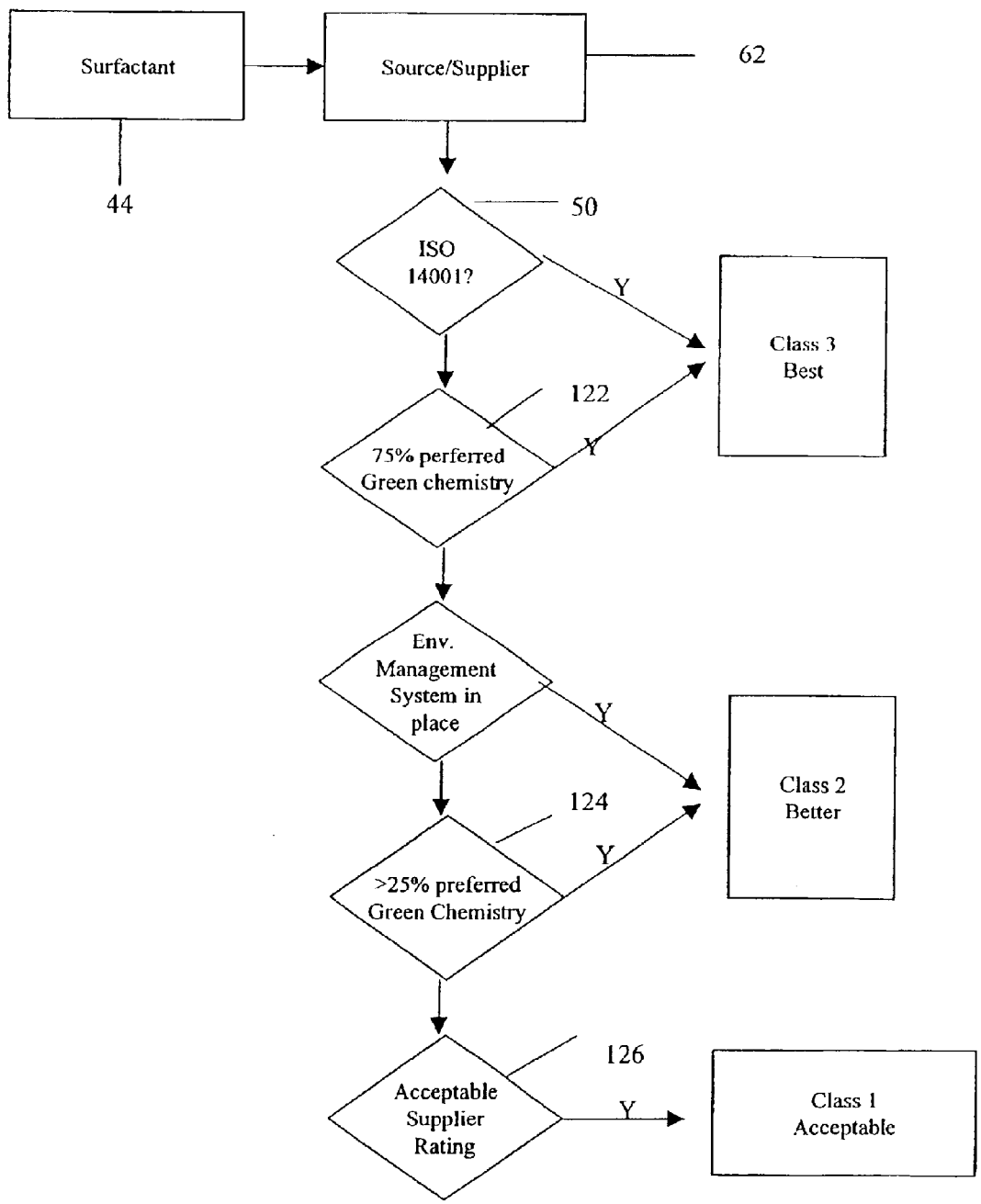
FIG. 6 is a chart illustrating methods relevant to supplier categorization for surfactants.

Referring now to FIG. 6, a supplier criteria 62 for evaluating adverse environmental impact due to the supplier is based on the ISO 14001 standard of the International Standard Organization. If the supplier is ISO 14001 certified, the supplier is automatically assigned a class of 3. If the supplier is not ISO 14001 certified, but more than 75% of the raw material supplied by the supplier is classified as a "preferred" raw material (122), the supplier can still be graded as a class 3.

If not, but if more than 25% of the raw material supplied by the supplier is preferred (124), a class of 2 can be applied, or if less than 25% of the raw material is preferred (126), a class of 1 can be applied with another indicator of good environmental characteristics. Otherwise, a class of 0 can be applied.

Figure 7:
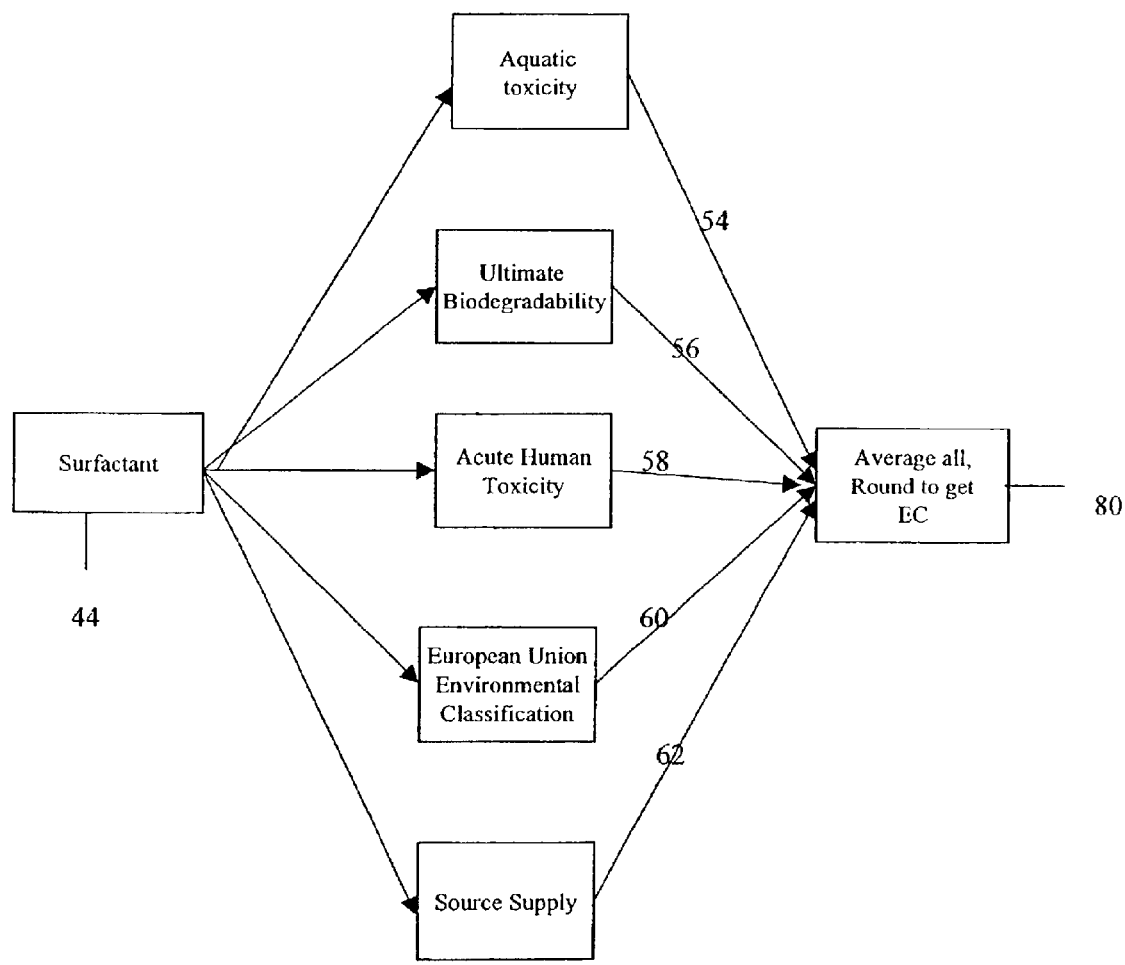
FIG. 7 is a chart illustrating how a preliminary environmental class/grade ("EC") can be calculated using the primary criteria scores for surfactants.

Referring now to FIG. 7, the five main sub-grades 54, 56, 58, 60 and 62 can be averaged to yield an EC or grade 80.

Figure 8:
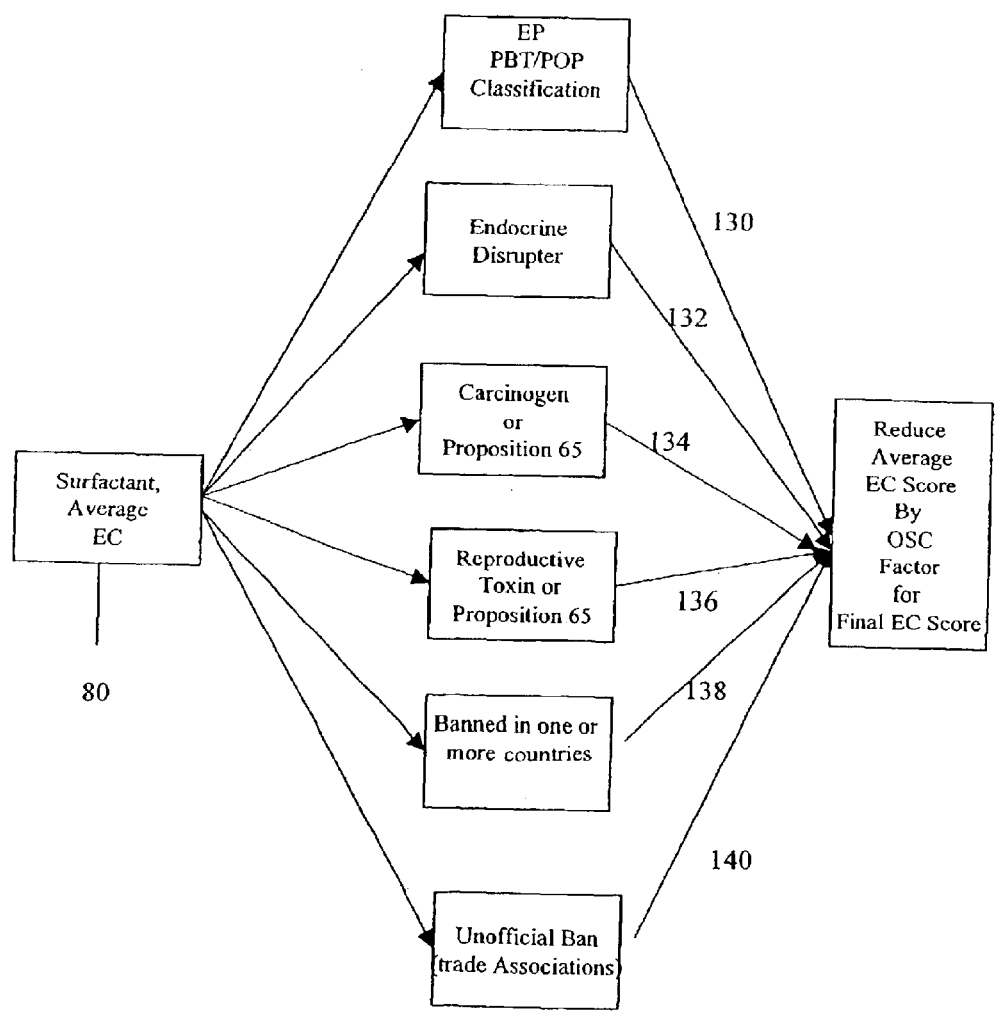
FIG. 8 is a chart illustrating methods relevant to varying the EC based on special environmental concerns relevant to surfactants.

Then, the chemical component may also be evaluated for other concerns based on the selected functional category, as shown in FIG. 8. For surfactants 44, these concerns include EPA ("EP") persistent bioaccumulative toxin (PBT)/persistent organic pollutant (POP)classifications (130), endocrine disruptors (130), carcinogenicity as defined, for example, in California proposition 65 (134), reproduction toxins as defined, for example, in California proposition 65 (136), a determination as to whether the chemical component has been banned in one or more country (138), and whether any unofficial bans, such as a ban by a trade association (140), has been applied to the chemical component under test. If any of these factors apply, environmental class/grade determined by the averaging process (80) of FIG. 1 is reduced (e.g. by one).

Figure 9:
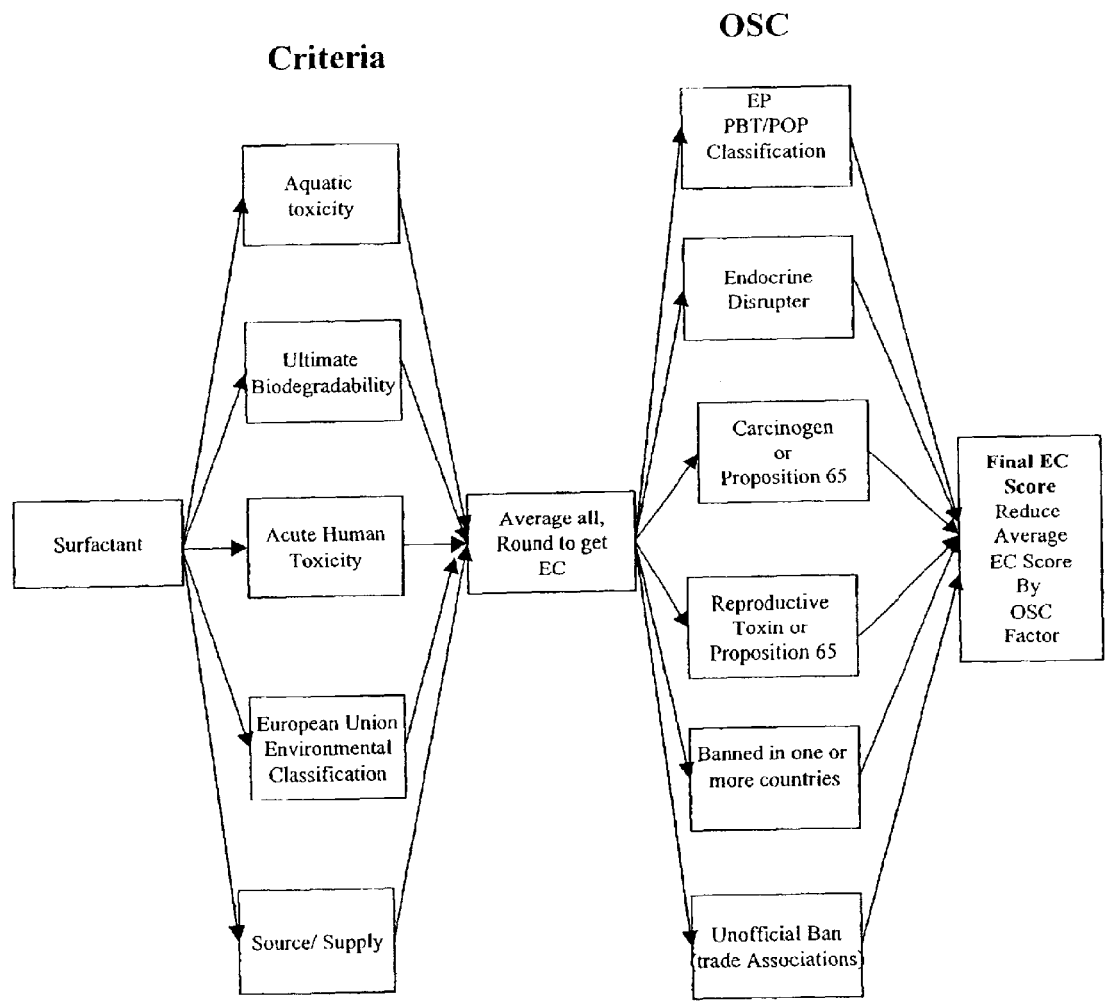
FIG. 9 is a chart summarizing the overall grading process for one chemical component.

FIG. 9 summarizes the surfactant grading process noted above.

Figure 10:
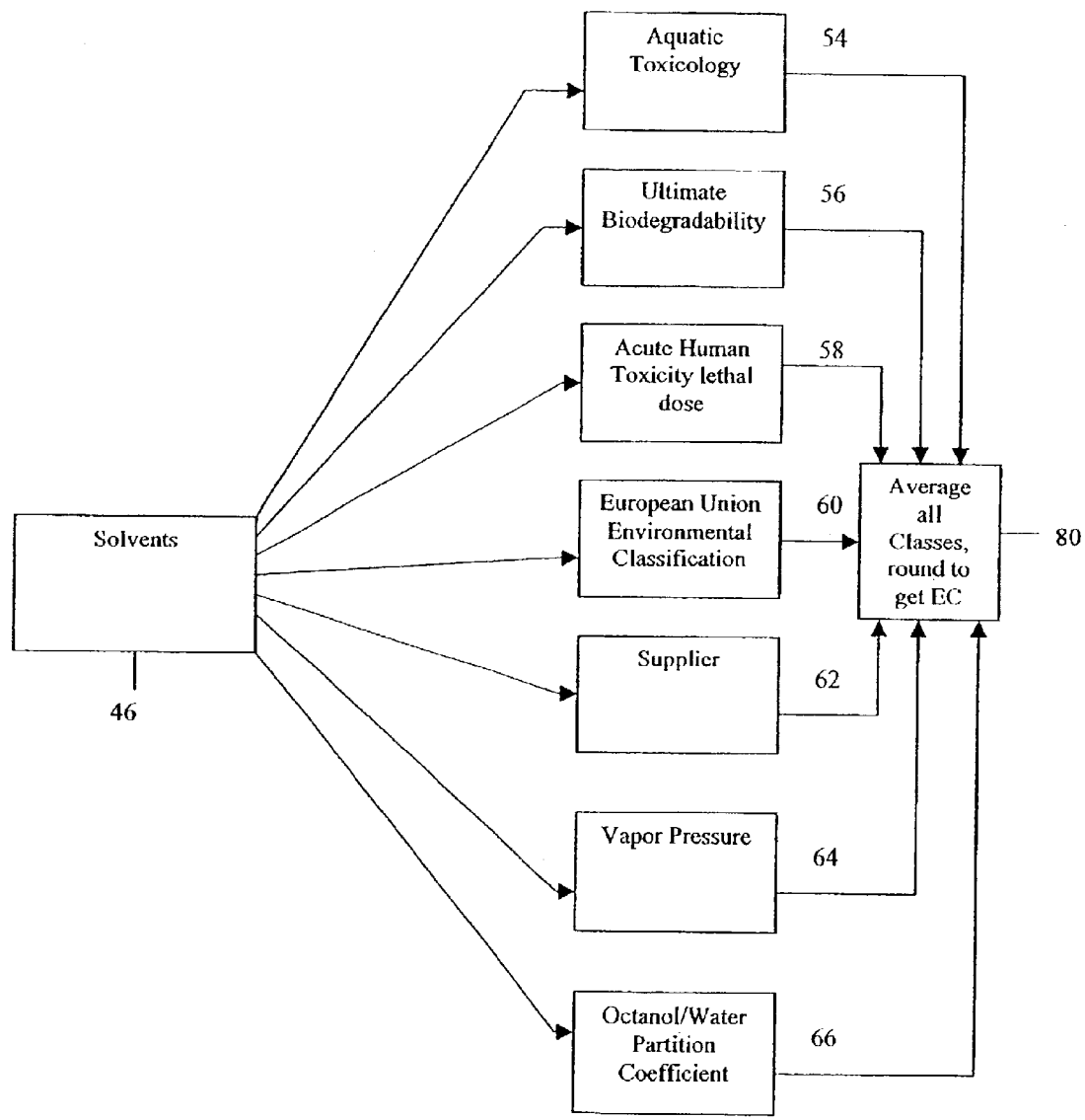
FIG. 10 is a chart illustrating category-specific criteria for solvents.

Referring next to FIGS. 10–13, other possible chemical analysis categories and the associated category-specified criteria are shown. FIG. 10 shows the associated criteria, albeit for the development of environmental classes for solvents. Here, additional analyses for vapor pressure 64 and octanol/water partition coefficient 66 are used for criteria.

Figure 11:
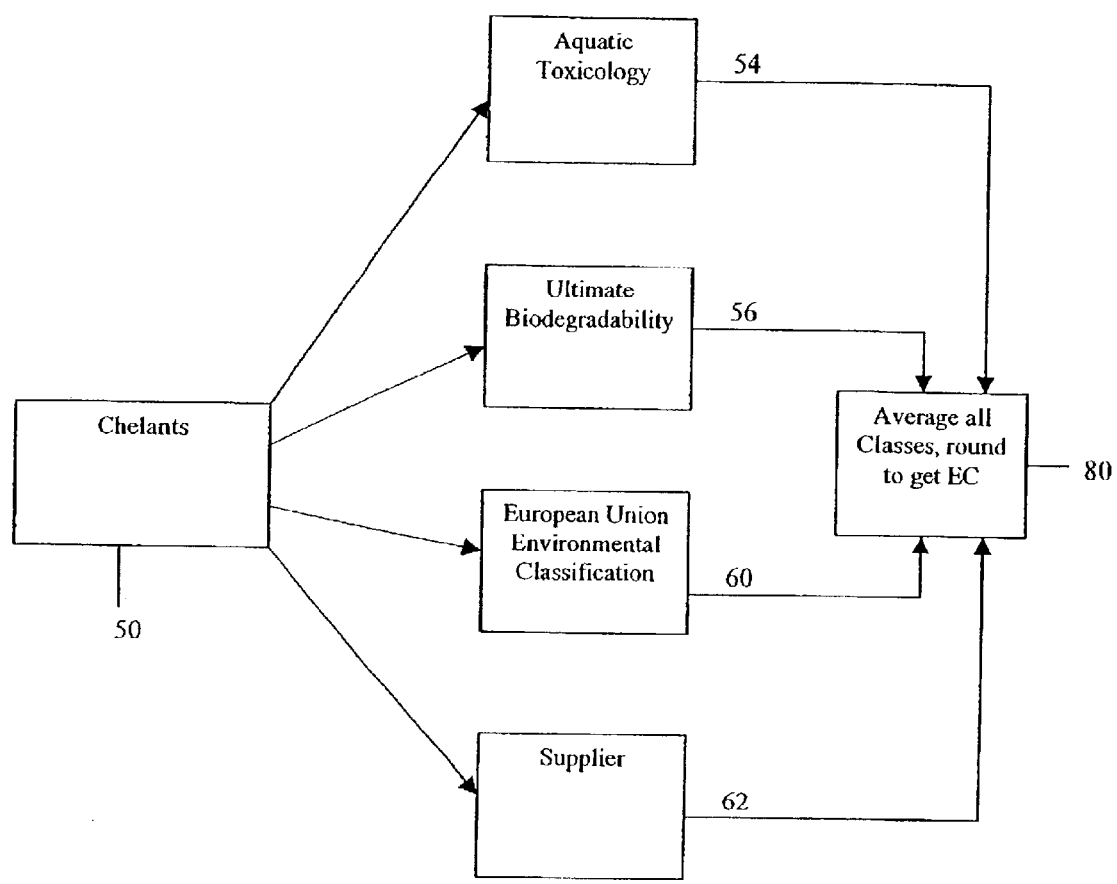
FIG. 11 is a chart illustrating category-specific criteria for chelants.

Referring to FIG. 11, chelants 50 can be graded based on aquatic toxicology 54, biodegradability 56, European Union environmental classification 60, and supplier classification 62, each of which are described above. In this category other significant concerns which might merit reduction of the environmental class (as shown in FIG. 8) include raw materials which tend to mobilize heavy metals in the environment, carcinogenicity, meet the EPA criteria for classification as a persistent bioaccumulative toxin (PBT)/allergy/sensitization, have treatogenicity or reproductive effects, are banned in one or more countries, or are banned unofficially by trade associations or the like.

Figure 12:
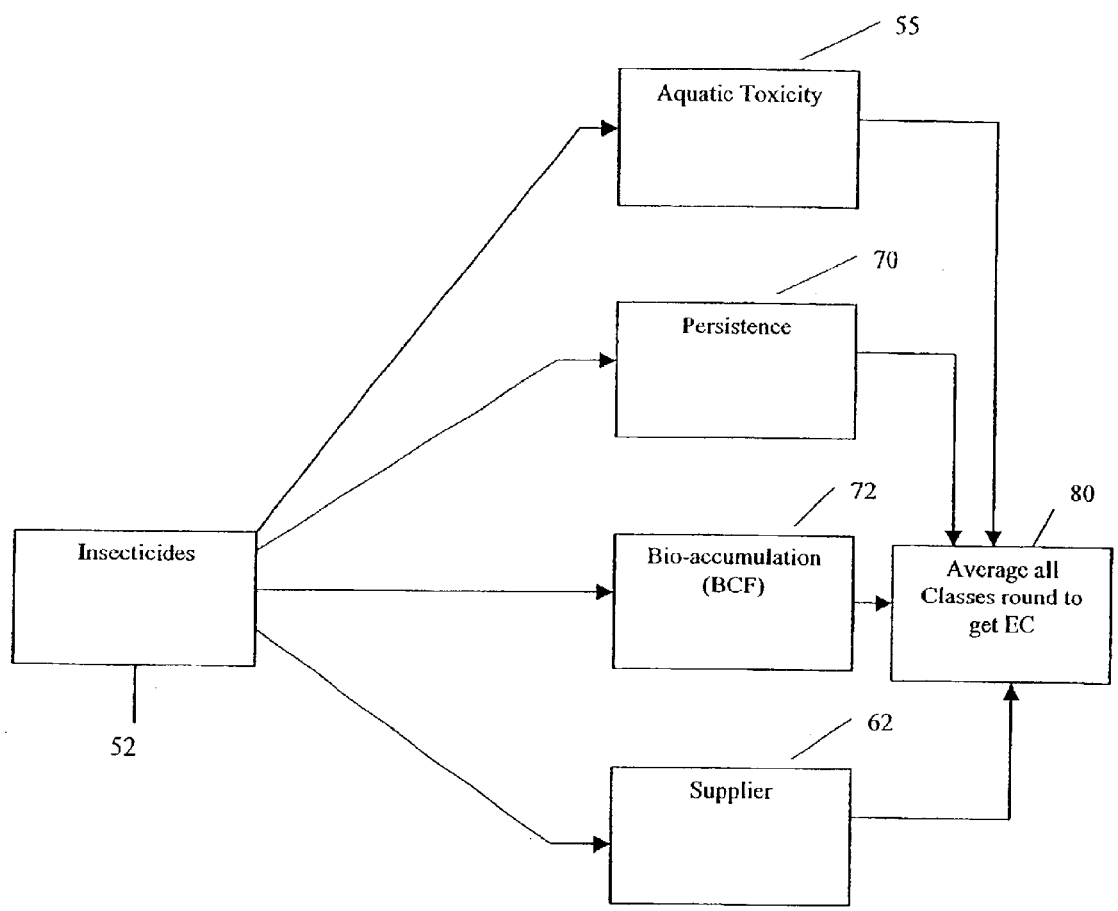
FIG. 12 is a chart illustrating category-specific criteria for insecticides.

FIG. 12 shows an insecticide 52 in which relevant criteria are aquatic toxicity 55, persistence 70, bio-accumulation Bio-concentration Factor (BCF) 72, where BCF is a measure of the ratio of concentration of a chemical inside an organism to the concentration in the surrounding environment, and supplier rating 62. In the insecticide category other significant concerns which may cause a reduction in the grade are a future EPA classification of persistent bioaccumlative toxin (PBT)/persistent organic pollutant (POP), endocrine disruption, indicated neural toxicity, or banning in one or more countries or unofficially by a trade association. Also important in this category are children's health or carcinogenicity issues.

Although not shown, propellants may be graded by an initial rating formed from a determination if the propellant comprises just compressed air, nitrogen or $CO_2$ (which merits the highest rating), or if it is hydrocarbon (which merits a middle rating), or if it is a more problematic gas such as CFC or HFC (which merits a lower rating).

Figure 13:
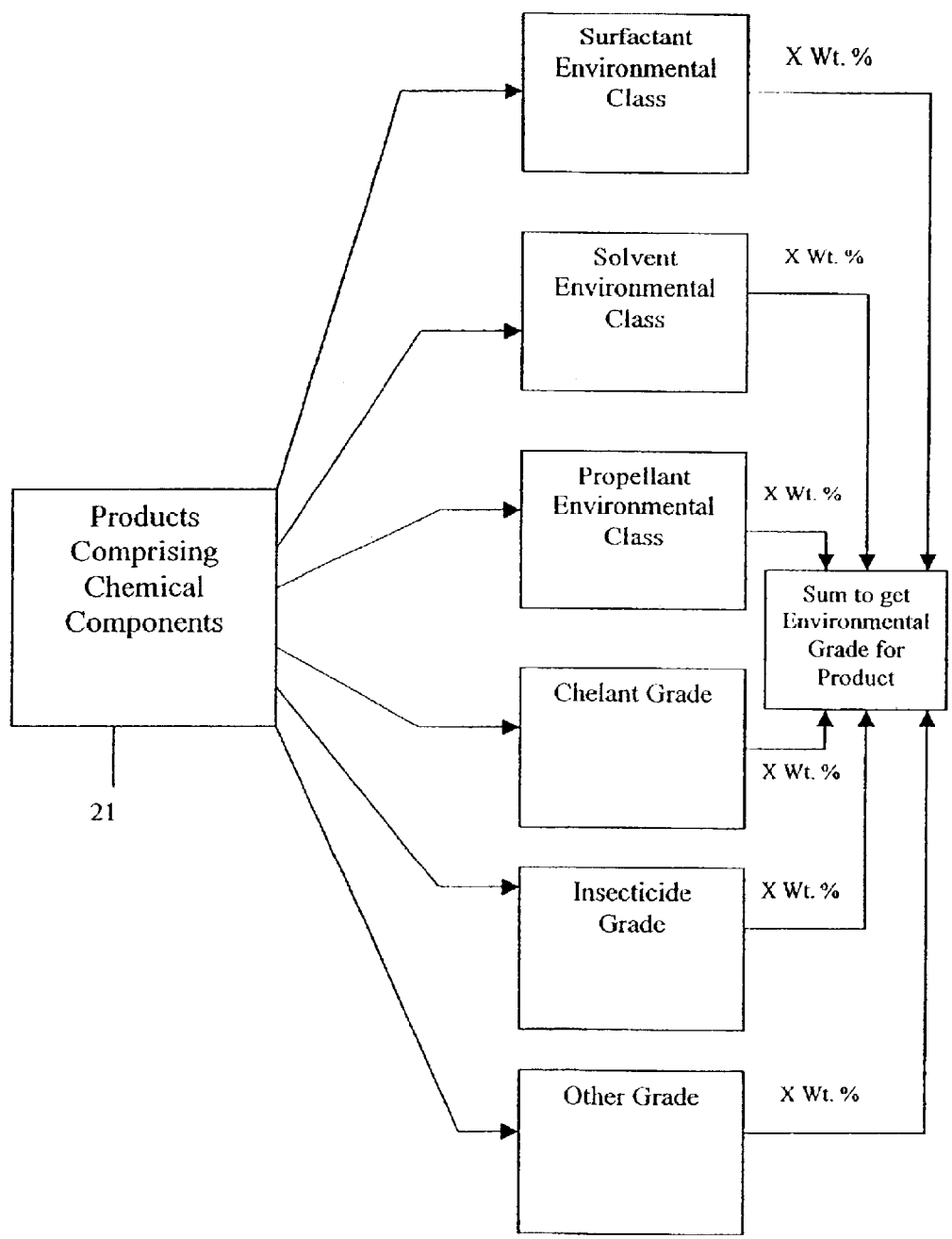
FIG. 13 is a chart illustrating methods relevant to calculating an overall environmental score for a product.

Referring now to FIG. 13, for a proposed chemical product 21, the environmental class determined for each chemical raw material as categorized in a selected functional category is multiplied by the weight of the chemical component or raw material in the product, and the resultant values are summed to provide an environmental grade for the overall product.

The following Tables I and II propose two different formulations for consideration as hard surface cleaners. In each case, the environmental class (computed by summing the criteria and dividing by the number of criteria) is multiplied by the percentage of the component. The Table II formula can be seen as being indicated as more environmentally friendly.

TABLE I

| Raw Materials | Percentage | Environ. Class | Environmental Grade |
|---|---|---|---|
| Deionized water | 66.81818 | 3 | 200.454 |
| Tetrasodium sale of EDTA, 40% | 19.63636 | 0 | 0 |
| Glycol ether | 10.90909 | 3 | 32.7272 |
| Nonylphenol ethoxylate | 1.36364 | 0 | 0 |
| Disinfectant | 0.49091 | 1 | 0.49091 |
| Co-surfactant | 0.36364 | 1 | 0.36364 |
| pH adjuster | 0.23636 | 0 | 0 |
| Fragrance | 0.18182 | 1 | 0.18182 |
| Total Percentage | 100 | | |
| Overall Grade | | | 234.218 |

TABLE II

| Raw Materials | Percentage | Environ. Class | Environmental Grade |
|---|---|---|---|
| Deionized water | 66.81818 | 3 | 200.454 |
| Biodegradable chelant | 19.63636 | 3 | 58.9090 |
| Glycol ether | 10.90909 | 3 | 32.7272 |
| Alcohol ethoxylate | 1.36364 | 2 | 2.72728 |
| Disinfectant | 0.49091 | 1 | 0.49091 |
| Co-surfactant | 0.36364 | 1 | 0.36364 |
| Organic pH adjuster | 0.23636 | 1 | 0.23636 |
| Fragrance | 0.18182 | 1 | 0.18182 |
| Total Percentage | 100 | | |
| Overall Grade | | | 296.090 |

The overall environmental grade of the product can also be listed on product labels to be used by consumers to make more informed decisions between competing products. For example, instead of producing only one product, a company might produce both a high strength formula with some environmental issues, and a low strength formula with a lesser set of environmental issues, leaving it to the consumer to make the trade-off after reading the labeling information.

To simplify determining the environmental grade of the product, a database can be constructed in which the environmental class associated with the chemical component for a given functional categories or for all defined functional categories is stored. Depending on the use of the chemical component, a previously-determined environmental class value, calculated as described above, can be retrieved from the database. The environmental class is then multiplied by the weight of the chemical component in a proposed product. To determine an environmental grade for a chemical product, this process would be repeated for all of the chemical components in the product, and the results of the multiplications summed to provide the environmental grade, as described above. The database information could be stored in a book form, or as part of a computerized data storage device.

Although preferred embodiments have been described, it will be apparent that a number of revisions could be made within the spirit and scope of the invention. In this regard, although a grading system noted above assigns each component a collective grade based on summing the criteria divided by the number of criteria, with a 0 to 3 scale for each sub-criteria (with the higher numbers being more environmentally friendly), other numerical approaches could be used.

For example, the lower numbers for each criteria could be the ones assigned the environmentally friendly attributes. Also, the number scale could be 1–100, or otherwise different. Accordingly, the claims should be referred to in order to determine the full scope of the invention.

INDUSTRIAL APPLICABILITY

The invention provides grading systems for environmentally grading components, and formulas that incorporate them. Such grading systems provide methods for selecting formulations with improved environmental characteristics.

What is claimed is:

1. A computer-implemented method for environmentally classifying an environmental impact of a chemical component for a selected functional use, the method comprising:
    assigning the chemical component to a category based on a proposed functional use of the chemical component;
    comparing the chemical component to at least two environmental category-specific criteria associated with the category;
    assigning a class numerical value for each said criteria based on the result of the comparison; and
    combining the class numerical values assigned to the chemical component for each of the category specific criteria associated with the category;
    whereby the combination provides an overall environmental class for the chemical component;
    wherein the environmental class for the chemical component reflects a numerical value representing at least two criteria selected from the group consisting of aquatic toxicology, persistence, biodegradability, acute human toxicity, European Union environmental classification, supplier rating, vapor pressure, water partition coefficient, propellant rating, aquatic toxicity, and bio-accumulation; and
    wherein the biodegradability criteria is selected and reflects a comparison to an OECD 301 standard.

2. A computer-implemented method for environmentally classifying an environmental impact of a chemical component for a selected functional use, the method comprising:
    assigning the chemical component to a category based on a proposed functional use of the chemical component;
    comparing the chemical component to at least two environmental category-specific criteria associated with the category;
    assigning a class numerical value for each said criteria based on the result of the comparison; and
    combining the class numerical values assigned to the chemical component for each of the category specific criteria associated with the category;
    whereby the combination provides an overall environmental class for the chemical component;
    wherein the environmental class for the chemical component reflects a numerical value representing at least two criteria selected from the group consisting of aquatic toxicology, persistence, biodegradability, acute human toxicity, European Union environmental classification, supplier rating, vapor pressure, water partition coefficient, propellant rating, aquatic toxicity, and bio-accumulation; and
    wherein the acute human toxicity criteria is selected and reflects a comparison to a LD50 standard.

3. A computer-implemented method for environmentally classifying an environmental impact of a chemical component for a selected functional use, the method comprising:
    assigning the chemical component to a category based on a proposed functional use of the chemical component;
    comparing the chemical component to at least two environmental category-specific criteria associated with the category;
    assigning a class numerical value for each said criteria based on the result of the comparison; and
    combining the class numerical values assigned to the chemical component for each of the category specific criteria associated with the category;
    whereby the combination provides an overall environmental class for the chemical component;
    wherein the environmental class for the chemical component reflects a numerical value representing at least two criteria selected from the group consisting of aquatic toxicology, persistence biodegradability, acute human toxicity, European Union environmental classification, supplier rating, vapor pressure, water partition coefficient, propellant rating, aquatic toxicity, and bio-accumulation; and
    wherein the supplier rating criteria is selected and reflects a comparison to an ISO 14000 standard and other supplier rating criteria.

4. A computer-implemented method for environmentally classifying an environmental impact of a chemical component for a selected functional use, the method comprising:
    assigning the chemical component to a category based on a proposed functional use of the chemical component;
    comparing the chemical component to at least two environmental category-specific criteria associated with the category;
    assigning a class numerical value for each said criteria based on the result of the comparison; and
    combining the class numerical values assigned to the chemical component for each of the category specific criteria associated with the category;
    whereby the combination provides an overall environmental class for the chemical component;
    wherein the environmental class for the chemical component reflects a numerical value representing at least two criteria selected from the group consisting of aquatic toxicology, persistence, biodegradability, acute human toxicity, European Union environmental classification, supplier rating, vapor pressure, octanol water partition coefficient, propellant rating, aquatic toxicity, and bio-accumulation; and
    wherein the propellant rating criteria is selected and reflects a rating system that rates certain non-hydrocarbon gasses as more environmentally favorable than hydrocarbon propellants.

5. A computer-implemented method for environmentally classifying an environmental impact of a chemical component for a selected functional use, the method comprising:
    assigning the chemical component to a category based on a proposed functional use of the chemical component;
    comparing the chemical component to at least two environmental category-specific criteria associated with the category;
    assigning a class numerical value for each said criteria based on the result of the comparison; and
    combining the class numerical values assigned to the chemical component for each of the category specific criteria associated with the category;
    whereby the combination provides an overall environmental class for the chemical component;

wherein the environmental class for the chemical component reflects a numerical value representing at least two criteria selected from the group consisting of aquatic toxicology, persistence, biodegradability, acute human toxicity, European Union environmental classification, supplier rating, vapor pressure, octanol water partition coefficient, propellant rating, aquatic toxicity, and bio-accumulation; and wherein a category for both formulas is chelants and the criteria comprises an aquatic toxicology rating, a biodegradability rating, an acute human toxicity rating, and a European Union environmental classification rating.

6. A computer-implemented method for formulating a product for a specified functional use, comprising:

(a) obtaining two possible formulas for the product, each formula having at least two chemical components;

(b) for each component, separately environmentally classifying an environmental impact of the component for the functional use for a formula by the following process:
  (i) assigning that chemical component to a category based on a proposed functional use of the chemical component;
  (ii) comparing that chemical component to at least two environmental category-specific criteria associated with that category;
  (iii) assigning a class numerical value for each said criteria for that chemical component based on the result of the comparison; and
  (iv) combining the class numerical values assigned to that chemical component for each of the category specific criteria associated with the category for that chemical component;
  whereby the combination provides an overall environmental class for the chemical component for a formula;

(c) with respect to each component in the first formula multiplying its environmental class times a number representative of its relative weight presence in the first formula;

(d) summing the result of the step (c) multiplications for the chemical components in the first formula to provide an environmental grade for the first formula;

(e) with respect to each component in the second formula multiplying its environmental class times a number representative of its relative weight presence in the second formula;

(f) summing the result of the step (e) multiplications for the chemical components in the second formula to provide an environmental grade for the second formula; and (g) comparing resulting environmental grades for the first and second formulas, and based at least in part on the comparison selecting a formulation for the product.

7. The method of claim 6, wherein the combined class numerical values for at least one component are further adjusted to reflect other environmental concerns specific to the functional category.

8. The method of claim 6, wherein at least one category is selected from the group consisting of a surfactant category, a solvent category, a preservative category, a fragrance category, an organic acid category, an inorganic acid category, a dye category, a wax category, a propellant category, a chelant category, and an insecticide category.

9. The method of claim 6, wherein the environmental class for at least one chemical component reflects a numerical value representing at least two criteria selected from the group consisting of aquatic toxicology, persistence, biodegradability, acute human toxicity, European Union environmental classification, supplier rating, vapor pressure, water partition coefficient rating, propellant rating, aquatic toxicity, and bio-accumulation.

10. The method of claim 9, wherein the aquatic toxicology criteria is selected and reflects a comparison to a LC50 standard.

11. The method of claim 9, wherein the bio-accumulation criteria is selected and reflects a comparison to fish BCF.

12. The method of claim 9, wherein a category for both formulas is surfactants and the criteria for both formulas comprises an aquatic toxicology rating, a biodegradability rating, an acute human toxicity rating, and a European Union environmental classification rating.

13. The method of claim 9, wherein a category for both formulas is solvents and the criteria comprises an aquatic toxicology rating, a biodegradability rating, an acute human toxicity rating, a European Union environmental classification rating, a vapor pressure rating, and a water partition coefficient rating.

14. The method of claim 9, wherein a category for both formulas is insecticides and the criteria comprises an aquatic toxicity rating, a persistence rating, a bioaccumulation rating, and a supplier rating.

* * * * *

UNITED STATES PATENT AND TRADEMARK OFFICE
CERTIFICATE OF CORRECTION

| | | |
|---|---|---|
| PATENT NO. | : 6,973,362 B2 | Page 1 of 1 |
| APPLICATION NO. | : 10/458,746 | |
| DATED | : December 6, 2005 | |
| INVENTOR(S) | : David C. Long, Frederick H. Martin and John A. Weeks | |

It is certified that error appears in the above-identified patent and that said Letters Patent is hereby corrected as shown below:

At column 7, line 19, replace [category-specified] with ---category-specific---

In claim 3, column 10, line 16, replace [persistence biodradability] with ---persistence, biodegradability---

In claim 5, column 11, line 9, replace [a category for both formulas] with ---the category---

Signed and Sealed this

Twenty-second Day of August, 2006

JON W. DUDAS
*Director of the United States Patent and Trademark Office*